United States Patent
Zhou et al.

(10) Patent No.: US 11,170,679 B2
(45) Date of Patent: Nov. 9, 2021

(54) DISPLAY CONTROL METHODS AND APPARATUSES, FLEXIBLE DISPLAY DEVICES FOR ADJUSTING DISPLAY PIXEL DENSITY

(71) Applicant: BEIJING ZHIGU RUI TUO TECH CO., LTD., Beijing (CN)

(72) Inventors: Liang Zhou, Beijing (CN); Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 182 days.

(21) Appl. No.: 15/543,172

(22) PCT Filed: Jan. 7, 2016

(86) PCT No.: PCT/CN2016/070336
§ 371 (c)(1),
(2) Date: Jul. 12, 2017

(87) PCT Pub. No.: WO2016/112819
PCT Pub. Date: Jul. 21, 2016

(65) Prior Publication Data
US 2018/0005553 A1    Jan. 4, 2018

(30) Foreign Application Priority Data

Jan. 16, 2015  (CN) .......................... 201510024380.7

(51) Int. Cl.
*G09G 3/20*     (2006.01)
*G06T 7/174*    (2017.01)
*G09G 3/00*     (2006.01)

(52) U.S. Cl.
CPC ............. *G09G 3/035* (2020.08); *G06T 7/174* (2017.01); *G09G 3/20* (2013.01); *G09G 2320/064* (2013.01)

(58) Field of Classification Search
CPC .......... G09G 3/007; G09G 3/20; G09G 5/003; G09G 5/14; G09G 3/00; G09G 2320/064;
(Continued)

(56) References Cited

U.S. PATENT DOCUMENTS 6,077,226 A * 6/2000 Washburn ................. A61B 8/06
                                                600/443
6,661,425 B1 * 12/2003 Hiroaki .................... G09G 3/003
                                                345/1.1

(Continued)

FOREIGN PATENT DOCUMENTS

CN    101103375 A    1/2008
CN    101543085 A    9/2009
(Continued)

OTHER PUBLICATIONS

International Search Report and Written Opinion for Application No. PCT/CN2016/070336, dated Mar. 21, 2016, 11 pages.

(Continued)

*Primary Examiner* — Ke Xiao
*Assistant Examiner* — James S Nokham
(74) *Attorney, Agent, or Firm* — Sheppard Mullin Richter & Hampton LLP

(57) ABSTRACT

Embodiments of the present application disclose time division display control methods and apparatus and display devices, wherein a time division display control method disclosed comprises: displaying a first image by a display device; and changing display pixel distribution of the display device at least once within a preset permitted staying duration of vision of human eyes and displaying the first image by the display device changed each time, to cause the displayed first images to be displayed in human eyes as a second image in an overlapped manner. According to the present application, utilization of display pixels of a display (Continued)

---

S101 — Display a first image by means of a display device

S102 — Change display pixel distribution of the display device at least once within a preset permitted staying duration of vision of human eyes and display the first image by the display device changed each time, to cause the displayed first images to be displayed in human eyes as a second image in an overlapped manner device and a display quality of at least a local part of an image can be improved, thereby better meeting diversified actual application demands of users.

24 Claims, 11 Drawing Sheets

(58) Field of Classification Search
CPC . G09G 2380/02; G06F 1/1694; G06F 3/0481; A91B 3/12; G06T 7/174; H04N 5/44
See application file for complete search history.

(56) References Cited

U.S. PATENT DOCUMENTS

| | | | |
|---|---|---|---|
| 8,797,444 B2 | 8/2014 | Tanaka et al. | |
| 2002/0036750 A1* | 3/2002 | Eberl | A61B 3/12 351/207 |
| 2006/0109391 A1* | 5/2006 | Huitema | G09G 3/3611 349/19 |
| 2006/0110072 A1 | 5/2006 | Domera-Venkata | |
| 2007/0266412 A1 | 11/2007 | Trowbridge et al. | |
| 2008/0030527 A1 | 2/2008 | Namie et al. | |
| 2009/0219225 A1* | 9/2009 | Cope | G09F 9/30 345/55 |
| 2009/0289877 A1* | 11/2009 | Kwon | G02F 1/133305 345/82 |
| 2010/0033405 A1 | 2/2010 | Aragaki et al. | |
| 2012/0019465 A1 | 1/2012 | Chen et al. | |
| 2012/0121207 A1* | 5/2012 | Doyle | G06F 3/0481 382/298 |
| 2012/0188245 A1 | 7/2012 | Hyatt | |
| 2013/0258460 A1* | 10/2013 | Liou | G02B 27/2214 359/463 |
| 2013/0321740 A1* | 12/2013 | An | H05K 5/0217 349/58 |
| 2014/0015743 A1* | 1/2014 | Seo | G06F 1/1694 345/156 |
| 2014/0055394 A1* | 2/2014 | Park | H01L 41/0825 345/173 |
| 2014/0232722 A1 | 8/2014 | Deluca | |
| 2014/0285477 A1* | 9/2014 | Cho | G09G 3/2003 345/207 |
| 2015/0189140 A1* | 7/2015 | Sutton | H04N 5/2257 348/208.1 |
| 2016/0295257 A1* | 10/2016 | Iguchi | H04N 5/44 |

FOREIGN PATENT DOCUMENTS

| | | |
|---|---|---|
| CN | 101689351 A | 3/2010 |
| CN | 102402929 A | 4/2012 |
| CN | 104157660 A | 11/2014 |
| CN | 104537976 A | 4/2015 |
| JP | 2006-129411 A | 5/2006 |

OTHER PUBLICATIONS

Bar-Cohen, Y., "Electroactive polymers for refreshable Braille displays," SPIE, 2009, 3 pages.
Maimone et al., "Focus 3D: Compressive Accommodation Display," ACM Transactions on Graphics, 2013, 12 pages.
Nagano, et al., "An Autostereoscopic Projector Array Optimized for 3D Facial Display," USC Institute for Creative Technologies, SIGGRAPH 2013, 2 pages.
Pelican Imaging: Life in 3D, "PiCam: An Ultra-Thin High Performance Monolithic Camera," downloaded from website http://www.pelicanimaging.com/technology on Jun. 13, 2017, 30 pages.
Wilburn et al., "High Performance Imaging Using Large Camera Arrays," SIGGRAPH, 2005, p. 765-776.
Yu et al., "Directed bending of a polymer film by light," Nature, Sep. 2003, vol. 425, p. 145.

* cited by examiner

DISPLAY CONTROL METHODS AND APPARATUSES, FLEXIBLE DISPLAY DEVICES FOR ADJUSTING DISPLAY PIXEL DENSITY

RELATED APPLICATION

The present international patent cooperative treaty (PCT) application claims priority to and benefit of Chinese Patent Application No. 201510024380.7, filed on Jan. 16, 2015, and entitled "Time Division Display Control Methods and Apparatuses and Display Devices", which is hereby incorporated into the present international PCT application by reference herein in its entirety.

TECHNICAL FIELD

The present application generally relates to the field of display technologies, and in particular, to various time division display control methods and apparatuses and various display devices.

BACKGROUND

Image processing covers image capture, image display, and the like. With the constant development of image processing technologies, both of image capturing resolution and image display resolution are greatly improved. However, in view of the trend of the technological development, an image capture capability of a single image sensor is higher than an image display capability of a single display device, and resolution for capturing an image is higher than resolution for displaying an image. The two are not well unmatched. A display quality of an image is to be further improved.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble, and to be described later in more detail.

The present application provides various time division display control methods and apparatuses and various display devices.

According to one aspect, an embodiment of the present application provides a time division display control method, comprising:

displaying a first image by a display device; and changing display pixel distribution of the display device at least once within a preset permitted staying duration of vision of human eyes and displaying the first image by the display device changed each time, to cause the displayed first images to be displayed in human eyes as a second image in an overlapped manner.

According to another aspect, an embodiment of the present application further provides a time division display control apparatus, comprising:

an image display module, configured to display a first image by a display device; and a time division display control module, configured to change display pixel distribution of the display device at least once within a preset permitted staying duration of vision of human eyes and display the first image by the display device changed each time, to cause the displayed first images to be displayed in human eyes as a second image in an overlapped manner.

According to still another aspect, an embodiment of the present application further provides a display device, display pixel distribution of the display device being adjustable, comprising any one of time division display control apparatuses provided in the embodiments of the present application.

In the technical solutions provided in the embodiments of the present application, a display device displays multiple first images within a preset permitted staying duration of vision of human eyes, and by using a feature of duration of vision of human eyes, the first images formed on retinas of human eyes may be kept within a preset permitted staying duration of vision. In addition, when the display device displays a corresponding first image in a time division manner, display pixel distribution of the display device is different. Therefore, local resolution of the first images displayed by the display device within the preset staying duration of vision of human eyes is varied, which is equivalent to that, by adjusting display pixel distribution of the display device, the first images obtained due to at least one change are made different in a sub-pixel level, and the first images displayed by the display device in the time division manner are displayed in human eyes in an overlapped manner and a second image is obtained. Compared with resolution of a single first image, overall resolution of the second image is increased. However, based on the feature of the duration of vision of human eyes, human eyes cannot recognize such a change. Therefore, it is equivalent to that human eyes see a relatively-high-resolution second image, thereby improving utilization of a display pixel of a display device and a display quality of at least a local part of an image and better meeting diversified actual application demands of users.

These and other advantages of the present application will be more evident through the following detailed description about optional embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are included in the specification and form a part of the specification, and are configured to further exemplify alternative embodiments of the present application and explain the principle and advantages of the present application. In the drawings.

Figure 1A:
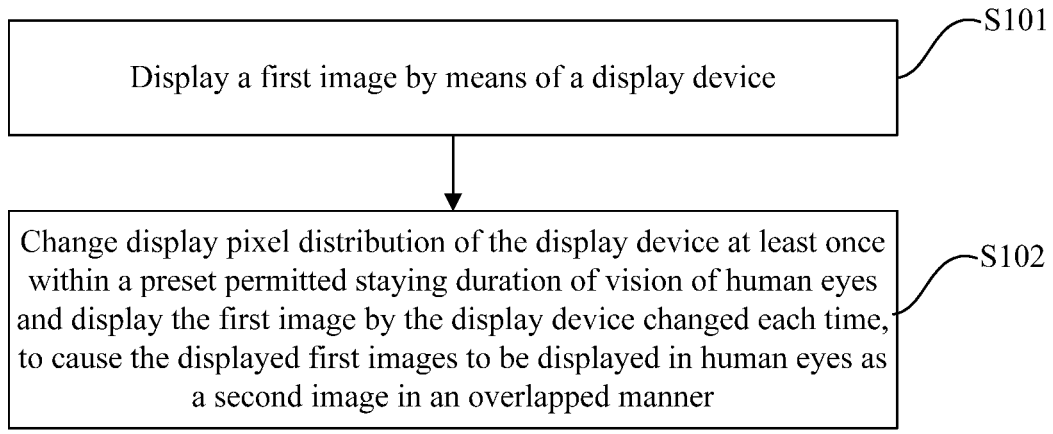
FIG. 1a is a flowchart of a time division display control method according to an embodiment of the present application.

Those skilled in the art should understand that, elements in the accompanying drawings are merely shown for simplicity and clarity, and may not be drawn proportionally. For example, the sizes of some elements in the accompanying drawings may be enlarged relative to other elements, so as to help improve understanding of the embodiments of the present application.

DETAILED DESCRIPTION

Exemplary embodiments of the present application are described below in detail with reference to the accompanying drawings. For the sake of clarity and simplicity, not all the features of actual implementations are described in detail in the specification. However, it should be understood that, lots of decisions specific to implementations must be made during development of any such actual embodiment, so as to achieve specific goals of developers, for example, restrictions relevant to systems and services need to be met, and the restrictions may vary with different implementations. In addition, it should also be understood that, although development work is likely to be very complicated and time-consuming, those skilled in the art will likely benefit from the disclosure in actual implementation.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Specific implementations of the present application are further described in detail below with reference to the accompanying drawings (in which like elements are denoted by like reference numerals) and embodiments. The following embodiments are intended to describe the present application, but not to limit the scope of the present application.

It should be understood by those skilled in the art that the terms such as "first" and "second" in the present application are merely intended to distinguish different steps, devices or modules, etc., which neither represent any particular technical meaning nor indicate a necessary logical sequence between them.

FIG. 1a is a flowchart of a time division display control method according to an embodiment of the present application. The time division display control method provided in this embodiment of the present application may be performed by a time division display control apparatus. The time division display control apparatus may be, but is not limited to, being used in application processes such as an image display process and a video playback process. In the time division display control method, the time division display control apparatus controls displaying of an image. A device manifestation form of the time division display control apparatus is not limited, for example, the time division display control apparatus may be an independent component, and the component cooperatively communicates with a display array; or the time division display control apparatus may be integrated into a display device as a functional module, which is not limited in this embodiments of the present application.

Specific content is as shown in FIG. 1a, and a time division display control method provided in this embodiment of the present application comprises:

S101: Display a first image by a display device.

S102: Change display pixel distribution of the display device at least once within a preset permitted staying duration of vision of human eyes and display the first image by the display device changed each time, to cause the displayed first images to be displayed in human eyes as a second image in an overlapped manner.

The display device may comprise multiple display pixels distributed in array. The display pixel may comprise, but is not limited to, at least one light-emitting unit. The light-emitting unit may comprise, but is not limited to, an LED (Light Emitting Diode) light-emitting unit and an OLED (Organic Light Emitting Diode) light-emitting unit. A light-emitting color of the light-emitting unit may be determined according to an actual need, and the light-emitting unit may comprise, but is not limited to, one or more light-emitting subunits. The light-emitting subunit may comprise an LED light-emitting subunit and an OLED light-emitting subunit. The multiple light-emitting subunits may comprise, but is not limited to, LED light-emitting subunits and OLED light-emitting subunits that have different colors such as red (R), green (G), and blue (B).

The display device in this embodiment of the present application is a display device with adjustable display pixel distribution. The display device may comprise, but is not limited to, a flexible display device. The flexible display device comprises at least a flexible substrate and multiple display pixels formed on the flexible substrate, where the flexible substrate may make changes such as expansion and contraction and bending to adjust display pixel distribution thereof when meeting certain conditions.

With reference to such a feature of adjustable display pixel distribution of a display device, in this embodiment of the present application, distribution of actual display pixel of a display device may be changed by adjusting display pixel distribution of the display device, for example, in a normal state, the display pixel distribution of the display device is even. By adjusting the display pixel distribution of the display device, the display pixel distribution thereof may be changed from even distribution to uneven distribution, and may further be changed to another uneven distribution manner different from a current uneven distribution manner.

Duration of vision is a feature of human eyes. When human eyes observe an object, the observed object forms an image on retinas of human eyes, and the image is transmitted to a human brain by the optic nerve to cause a person to sense the image of the object. However, when the object is removed, an impression of the optic nerve on the object does not disappear instantly but remains for a certain duration. Such a feature of human eyes is referred to as "duration of vision of human eyes". The retention duration is a staying duration of vision of human eyes.

In addition to being related to the feature of human eyes, the staying duration of vision of human eyes is also related to a factor such as a light intensity of an image to some extent, and is generally 0.05 s to 0.2 s. Optionally, in one embodiment of the present application, with reference to an empirical value of the foregoing staying duration of vision and an actual need, the foregoing staying duration of vision or a sub-duration therein may be determined as the preset permitted staying duration of vision of human eyes in this embodiment of the present application. Display pixel distribution of the display device is changed at least once within the preset permitted staying duration of vision of human eyes and the first image is displayed by the display device changed each time, to cause the displayed first images to be displayed on retinas of human eyes in an overlapped manner.

In the technical solution provided in one embodiment of the present application, a display device displays multiple first images within a preset permitted staying duration of vision of human eyes, and by using a feature of duration of vision of human eyes, the first images formed on retinas of human eyes may be kept within a preset permitted staying duration of vision. In addition, when the display device displays a corresponding first image in a time division manner, display pixel distribution of the display device may be different. Therefore, local resolution of the first images displayed by the display device within the preset staying duration of vision of human eyes may vary, which is equivalent to that, by adjusting display pixel distribution of the display device, the first images obtained due to at least one change are made different in a sub-pixel level, and the first images displayed by the display device in the time division manner are displayed in human eyes in an overlapped manner and a second image is obtained. Compared with resolution of a single first image, overall resolution of the second image is increased. However, based on the feature of the duration of vision of human eyes, human eyes may not recognize such a change. Therefore, it is equivalent to that human eyes see a relatively-high-resolution second image, thereby improving utilization of a display pixel of a display device and a display quality of at least a local part of an image, and better meeting diversified actual application demands of users.

By using the technical solution provided in the embodiments of the present application in combination with the feature of adjustable display pixel distribution of a display device and the feature of the duration of vision of human eyes, first images respectively displayed in different states of display pixel distribution of a display device within a preset staying duration of vision of human eyes are overlapped to generate a second image, thereby obtaining the second image at least a local part of which has relatively high resolution, so as to improve a display quality of an image and improve user experience. A specific display control technology is not limited in the embodiments of the present application.

In an optional implementation manner, the displaying the first image by the display device changed each time comprises: performing, according to actual location information of a display pixel in the changed display device, sampling processing on the first image that is to be displayed; and controlling the changed display device to display the first image on which the sampling processing is performed. In this solution, according to an actual need, it may be determined whether it is necessary to perform sampling and adaption processing on the first image that is to be displayed by the display device according to an actual space location of a display pixel of the changed display device. If it is needed, sampling processing may be performed on the first image that is to be displayed by the display device according to actual location information of the display pixel of the changed display device, and therefore, on the basis of differentiated display definition of different regions of the first image, display effects such as that display ratios of sizes, shapes, and the like of different regions of the first image actually displayed by an adjusted display device match display ratios of sizes, shapes, and the like of corresponding regions of the first image before processing, may be achieved. In this case, it is convenient to display, in human eyes in an overlapped manner, first images that are displayed in different states of display pixel distribution of the display device, thereby improving definition of at least a local part of the second image that is displayed in the overlapped manner and a display quality of an image, and better meeting diversified application requirements of users.

In another optional implementation manner, the displaying the first image by the display device changed each time comprises: adjusting, according to actual location information of a display pixel in the changed display device, drive information of the first image that is to be displayed; and controlling the changed display device to display the corresponding first image according to the adjusted drive information. In this solution, according to an actual need, it may be determined whether it is required to make a drive adaption adjustment to a scanning drive manner of the first image that is to be displayed by the display device according to an actual space location of the display pixel of the changed display device. If it is needed, a drive adaption adjustment may be made to the scanning drive manner of the display device according to the actual space location of the display pixel of the changed display device, and therefore, on the basis of differentiated display definition of different regions of the first image displayed by the changed display device, display effects such as that display ratios of different regions of the first image actually displayed by the changed display device match actual ratios of corresponding regions of the first image, may be achieved. In this case, it is convenient to display, in human eyes in an overlapped manner, first images that are displayed in different states of display pixel distribution of the display device, thereby improving definition of at least a local part of the second image that is displayed in the overlapped manner and a display quality of an image, and better meeting diversified application requirements of users.

Display effects of an image of a display device before and after a change in display pixel distribution are exemplarily described with reference to FIG. 2a to FIG. 2d. This part is merely exemplary description and should not be understood as a limitation to essence of the technical solution of the present application.

Figure 2A:
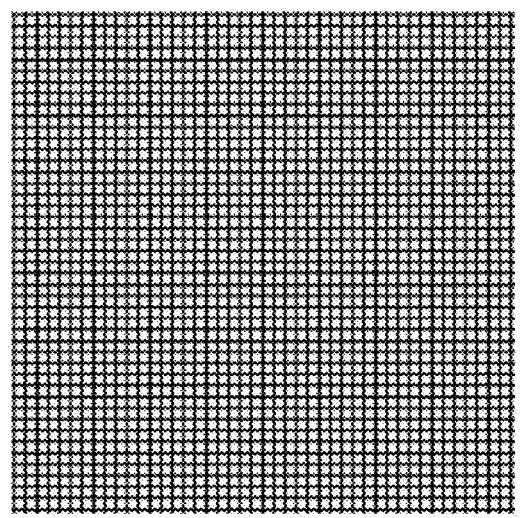
FIG. 2a is an optional example of display pixel distribution before a display device is adjusted according to an embodiment of the present application.
Figure 2B:
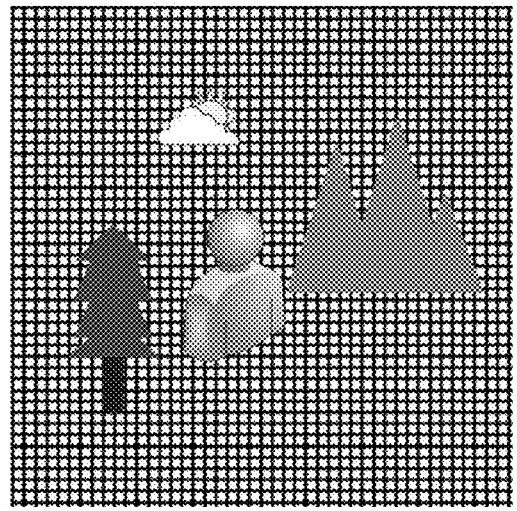
FIG. 2b is an optional example of a display effect of an image displayed by a display device, the pixel distribution of which is non-adjusted, according to an embodiment of the present application.

Display pixel distribution before the display device is changed is as shown in FIG. 2a. Density of display pixels is even (in a normal state). According to a first image displayed by the display device in this state, density of display pixels for displaying different regions (for example, a person, a tree, the sun, and the like in the figure) of the first image of the display device is the same. Therefore, definition of the different regions of the actually displayed first image is the same as shown in FIG. 2b.

Figure 2C:
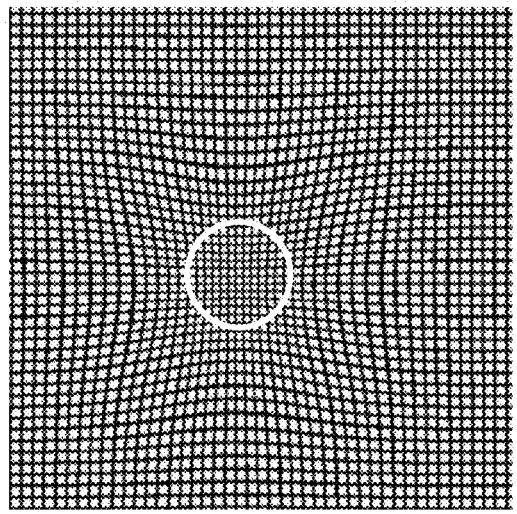
FIG. 2c is an optional example of display pixel distribution after a display device is adjusted according to an embodiment of the present application.
Figure 2D:
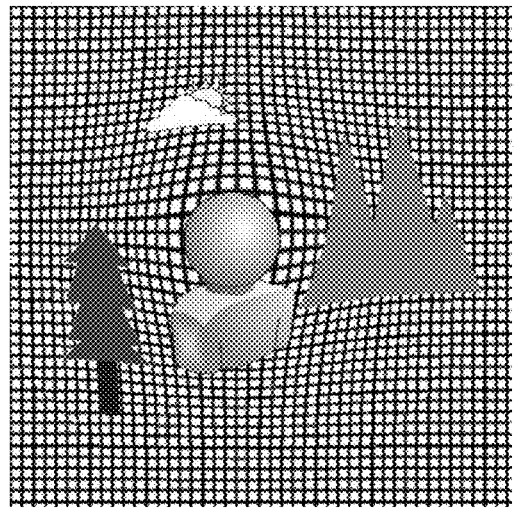
FIG. 2d is an optional example of a display effect of an image displayed by a display device, the pixel distribution of which is adjusted, according to an embodiment of the present application.

After display pixel distribution of the display device is adjusted to be unevenly distributed, the display pixel of the display device is unevenly distributed. As shown in FIG. 2c, display pixel density of a local region (such as, a central region) is relatively large, and display pixel density of other regions (such as, a marginal region) is relatively small. According to an image displayed by the changed display device, density of display pixels for displaying the different regions (for example, a person, a tree, the sun, and the like in the figure) of the image of the display device may be different. Therefore, definition of the different regions of the image actually displayed by the display device may also be different correspondingly. In some scenarios, if an effect that another display control factor such as drive information may have on a display effect is not taken into consideration, a local part of the image displayed by the changed display device may be deformed. For example, it is assumed that, drive information of a first image is driven according to index information of each display pixel of a display device. The index information is generally used to represent a serial number of each display pixel of the display device in a display pixel array, for example, a certain display pixel is a display pixel in row N, column M. The index information of each display pixel before or after display pixel density is adjusted remains unchanged. If drive information of a first image that is to be displayed by the changed display device remains unchanged and is still driven according to index information of display pixels of the display device, an interval during which two adjacent display pixels of the display device are driven remains unchanged, and when the changed display device is driven to display the first image according to the drive information, an image region (such as a human body part as shown in FIG. 2d) displayed by a region with large display pixel density is deformedly displayed, such as enlarging, to achieve a clearer display effect.

Figure 2E:
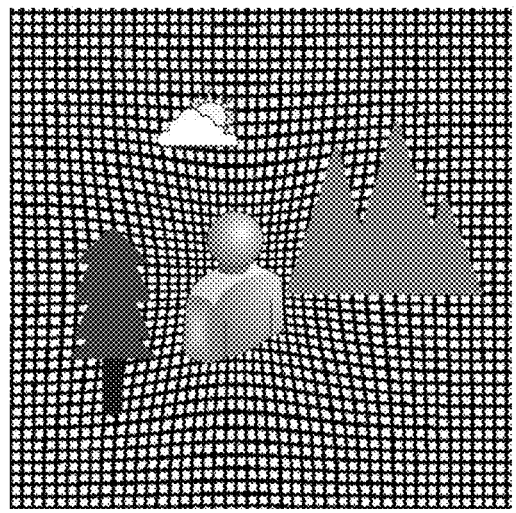
FIG. 2e is an optional example of an improved display effect of an image displayed by an adjusted display device according to an embodiment of the present application.

In some cases in an actual application, such as, such an image deformation effect is actually expected or desired, or a user does not mind a deformation effect, a display effect may not be adjusted. To achieve a display effect that display ratios of different regions are the same with display ratios of an original image but definition is different from definition of the original image, optionally, sampling processing may be first performed on the to-be-displayed first image according to actual location information of a display pixel of the adjusted display device, and pixel distribution of the first image after the sampling processing is corresponding to the actual location information of the display pixel of the changed display device. In this way, even though the drive information of information of the first image remains unchanged, display ratios of different regions of the actually displayed first image may also be adjusted by adjusting the to-be-displayed first image. An adjusted display effect is as shown in FIG. 2e. Display definition of different regions of the first image is different (such as, display pixel density of a part for displaying a human body of the changed display device is relatively large, and definition of a displayed human body image is relatively high), and display ratios of sizes, shapes, and the like of different parts of an image match display ratios of sizes, shapes, and the like of corresponding regions of an original image as shown in FIG. 2a. Alternatively, drive information of a to-be-displayed first image may also be adjusted according to actual location information of a display pixel of the changed display device, for example, the drive information of the first image is adjusted to be driven according to actual location information of the display pixel. According to this solution, even though sampling processing is not performed on the image, a similar effect that display ratios of different regions of an actually displayed image are adjusted may also be achieved by adjusting drive information for controlling displaying of the image.

In another optional implementation manner, multiple display control methods, such as sampling adaption processing is performed on a first image or a adaption adjustment is made to drive information of the first image, may also be combined to control displaying of an image, so as to achieve a better image display effect and improve user experience, which is not repeated again.

Figure 3:
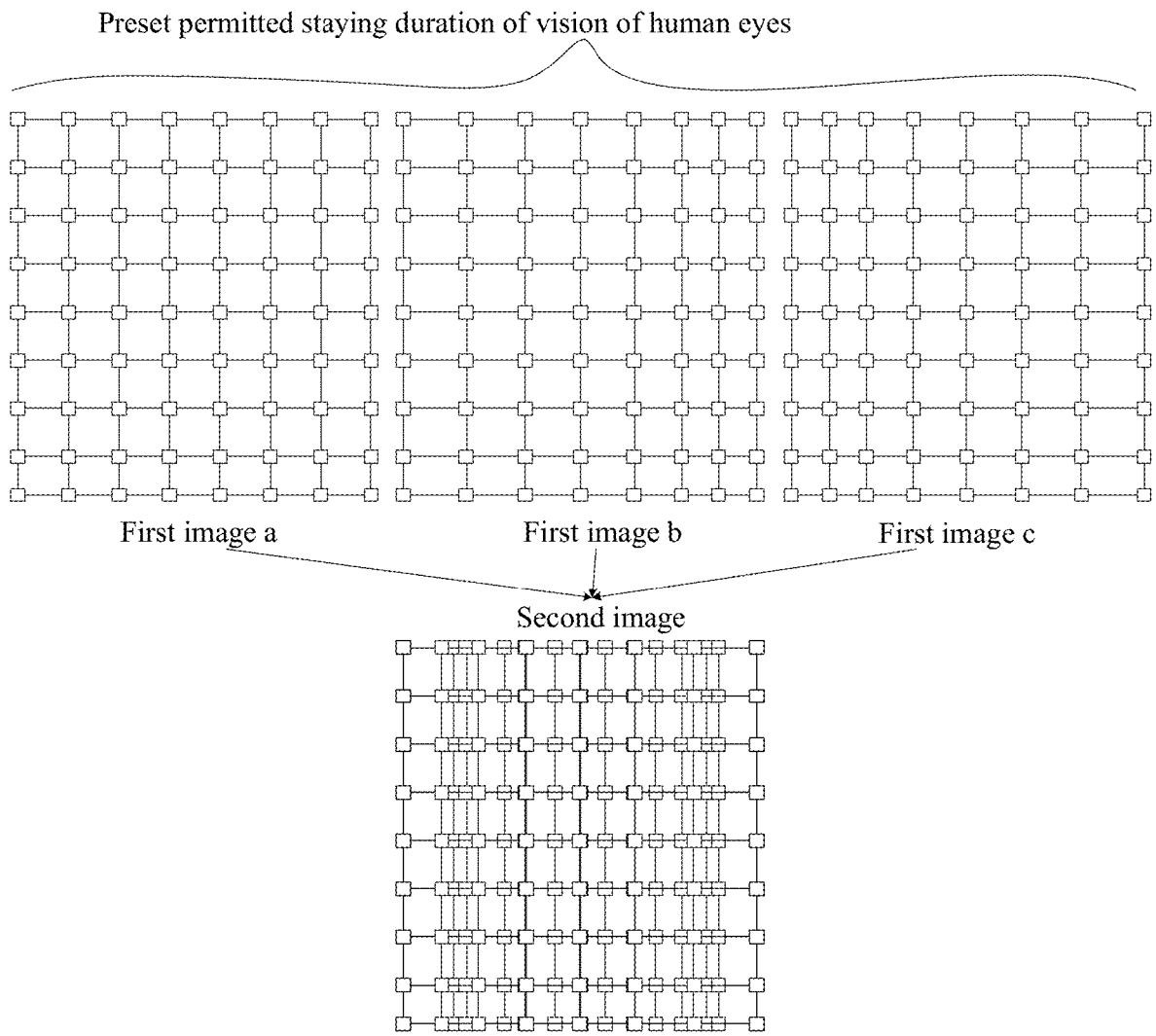
FIG. 3 is an optional example of an application scenario of image overlapping display control according to an embodiment of the present application.

An optional application example is as shown in FIG. 3. A display device displays a first image in a state in which display pixels thereof are evenly distributed, and the displayed first image is corresponding to a first image a formed on retinas of human eyes. Then, within the preset permitted staying duration of vision of human eyes, display pixel distribution of the display device is changed twice, and after display pixel distribution each time, first images are respectively displayed. The first images displayed twice are respectively corresponding to a first image b and a first image c formed on the retinas of the human eyes. Pixel density distribution of the first image a, the first image b, and the first image c are different, and at least, there is a sub-pixel-level difference in a local part. Based on a feature of duration of vision of human eyes, the first image a, the first image b, and the first image c are displayed in the human eyes in an overlapped manner, that is, a second image is formed. Resolution of at least a local part of the second image is higher than resolution of a single first image, thereby improving a display quality of an image observed by the human eyes.

In this embodiment of the present application, a method for changing display pixel distribution of a display device is very flexible, and a flexible implementation manner may be used according to an actual need. For example, changing display pixel distribution of the display device at least once comprises: determining a local display region of the display device as a first display region; and changing display pixel distribution of the first display region at least once. In an actual application, a local region of a display device may be determined as a first display region according to an actual need. The first display region is a display region whose display pixels are to be adjusted to be denser or sparser. In this case, display pixel distribution of the display device may be adjusted, to cause display pixel density of the first display region of the display device to be greater than display pixel density of another display region of the display device after the adjustment, or to cause display pixel density of the first display region of the display device to be less than display pixel density of another display region of the display device after the adjustment. According to this solution, it may be determined that a local display region of a display device is a display region with relatively large or small display pixel density according to an actual need, and based on this, display pixels of the display device are readjusted.

In this embodiment of the present application, a manner for changing display pixel distribution of a display device may be selected according to an actual need, for example, the changing display pixel distribution of the display device at any time comprises: determining deformation control information of a controllable deformable material portion of the display device according to the first display region; and changing the display pixel distribution of the first display region according to the deformation control information. According to this solution, display pixel distribution of the display device is changed by controlling deformation of a controllable deformable material portion. The solution is simple and easy to implement.

Figure 1B:
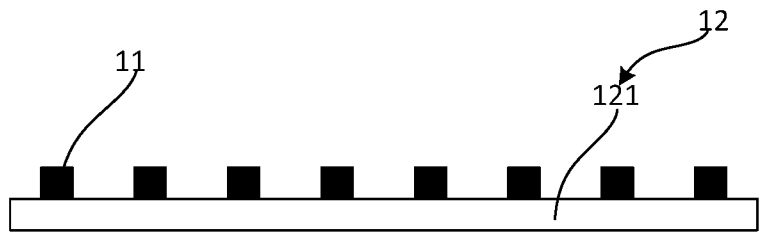
FIG. 1b is a schematic structural diagram of a first display device with adjustable pixel distribution according to an embodiment of the present application.

FIG. 1b is a schematic structural diagram of a display device with adjustable pixel density according to an embodiment of the present application. The display device provided in this embodiment of the present application is the display device with adjustable pixel density. As shown in FIG. 1b, the display device with adjustable pixel density provided in this embodiment of the present application comprises multiple display pixels 11 and a controllable deformable material portion 12. The display device displays an image by using the display pixels 11, the multiple display pixels 11 are distributed in an array, and the controllable deformable material portion 12 is respectively connected to the multiple display pixels 11; and the controllable deformable material portion 12 may produce deformation under the action of an external field, and density distribution of the multiple display pixels 11 is adjusted correspondingly by the deformation of the controllable deformable material portion 12. The controllable deformable material portion may make the display device produce deformation by changing a certain external effect factor (for example, an external field) acting on the display device. When the external field effect on the display device is cancelled or changed, the deformation of the controllable deformable material portion may be restored.

Among the multiple display pixels distributed in array and comprised in the display device with adjustable pixel density provided in this embodiment of the present application, each of the display pixels and the controllable deformable material portion may be closely connected in a manner which comprises, but is not limited to, adhesion; and in this way, when the controllable deformable material portion produces deformation, spacing between the display pixels will be adjusted correspondingly, thereby changing density distribution of the display pixels and achieving an effect of giving differentiated display pixel distribution to different regions of the display device according to an actual need.

In a process of actually applying the technical solution provided in this embodiment of the present application, an unevenly-distributed external field may act on different regions of the controllable deformable material portion, to cause the different regions of the controllable deformable material portion to produce deformation differently, thereby adjusting the overall density distribution of the display pixels. Optionally, the external field may act on a region in which the controllable deformable material portion and the multiple display pixels do not overlap, to cause a region in which the controllable deformable material portion and the display pixels overlap not to produce deformation. However, the density distribution of the display pixels is changed through deformation of other parts of the controllable deformable material portion. This solution may help avoid damage to the display pixels caused by deformation of the controllable deformable material portion.

Further, at least one suitable controllable deformable material may be selected, based on actual needs, to prepare the controllable deformable material portion, to cause the controllable deformable material portion to have features of being deformable and being recoverable from deformation. Optionally, the controllable deformable material portion is prepared from at least one or more of the following controllable deformable materials: a piezoelectric material, an electroactive polymer, a photostrictive material, and a magnetostrictive material.

The piezoelectric material may produce mechanical deformation due to the action of an electric field. A controllable deformable material portion prepared by using the piezoelectric material is hereinafter referred to as a piezoelectric material portion. By using such a physical property of the piezoelectric material, in this embodiment of the present application, electric field control information configured to make the piezoelectric material portion produce corresponding mechanical deformation may be determined according to, but not limited to, the target pixel density distribution information, an electric field acting on the piezoelectric material portion is controlled according to the electric field control information, to cause the piezoelectric material portion to produce corresponding mechanical deformation, and the pixel density distribution of the display device is correspondingly adjusted by the mechanical deformation of the piezoelectric material portion, thereby achieving the purpose of adjusting display pixel distribution of the display device according to the target pixel density distribution information. The piezoelectric material may comprise, but is not limited to, at least one of the following: piezoelectric ceramic and piezoelectric crystal. This solution can make full use of the physical property of the piezoelectric material to adjust pixel density distribution of the display device.

The electroactive polymer (referred to as EAPs) is a polymer material that can change their shapes or sizes under the action of an electric field. The controllable deformable material portion prepared from the EAPs is hereinafter referred to as an EAP portion. By using such a physical property of the EAPs, in this embodiment of the present application, electric field control information configured to make the EAP portion produce corresponding deformation may be determined according to, but not limited to, the target pixel density distribution information, an electric field acting on an EAP layer is controlled according to the electric field control information, to cause the EAP layer to produce corresponding deformation, and the pixel density distribution of the device display is correspondingly adjusted by the deformation of the EAP layer, thereby achieving the purpose of adjusting display pixel distribution of the device display according to the target pixel density distribution information. The EAPs may comprise, but are not limited to, at least one of the following: electronic EAPs and ionic EAPs; the electronic EAPs comprise at least one of the following: ferroelectric polymers (such as polyvinylidene fluoride), electrostrictive grafted elastomers and liquid crystal elastomers; and the ionic EAPs comprise at least one of the following: electrorheological fluids, ionic polymer-metallic composite materials and the like. This solution can make full use of the physical property of the EAPs to adjust pixel density distribution of the display device.

The photostrictive material is a polymer material that can change their shapes or sizes under the action of a light field. The controllable deformable material portion prepared from the photostrictive material is hereinafter referred to as a photostrictive material portion. By using such a physical property of the photostrictive material, in this embodiment of the present application, light field control information configured to make the photostrictive material portion produce corresponding deformation may be determined according to, but not limited to, the target pixel density distribution information, and a light field acting on the photostrictive material portion is controlled according to the light field control information, to cause the photostrictive material portion to produce corresponding deformation. The pixel density distribution of the display device is correspondingly adjusted by the deformation of the photostrictive material portion, thereby achieving the purpose of adjusting display pixel distribution of the display device according to the target pixel density distribution information. The photostrictive material may comprise, but is not limited to, at least one of the following: photostrictive ferroelectric ceramics and photostrictive polymers; the photostrictive ferroelectric ceramics comprise, but are not limited to, lead lanthanum zirconate titanate (PLZT) ceramics, and the photostrictive polymers comprise, but are not limited to, photostrictive liquid crystal elastomers. This solution can make full use of the physical property of the photostrictive material to adjust pixel density distribution of the display device.

The magnetostrictive material is a magnetic material that can change a magnetization state thereof under the action of a magnetic field and then change their sizes. The controllable deformable material portion prepared from the magnetostrictive material is hereinafter referred to as a magnetostrictive material portion. By using such a physical property of the magnetostrictive material, in this embodiment of the present application, magnetic field control information required to make the magnetostrictive material produce corresponding deformation according to, but not limited to, the target pixel density distribution information, and a magnetic field acting on the magnetostrictive material portion is controlled according to the magnetic field control information, to cause the magnetostrictive material portion to produce corresponding deformation. The pixel density distribution of the display device is correspondingly adjusted by the deformation of the magnetostrictive material portion, thereby achieving the purpose of adjusting display pixel distribution of the display device according to the target pixel density distribution information. The magnetostrictive material may comprise, but is not limited to, rare-earth giant magnetostrictive materials, such as alloy $Tbo_{0.3}Dy_{0.7}Fe_{1.95}$ materials using a $(Tb,Dy)Fe_2$ compound as a substrate. This solution can make full use of the physical property of the magnetostrictive material to adjust pixel density distribution of the display device.

In the technical solution provided in these embodiments of this application, a specific structure and a connection manner of the display pixels and the controllable deformable material portion may be determined according to an actual need, and the actual manner is very flexible.

In an optional implementation manner, as shown in FIG. 1b, the controllable deformable material portion 12 comprises a controllable deformable material layer 121. The multiple display pixels 11 are distributed in an array and connected to one side of the controllable deformable material layer 121. Optionally, it is feasible to choose to directly form the multiple display pixels on the controllable deformable material layer 121 according to actual process conditions, or the multiple display pixels and the controllable deformable material layer 12 may be prepared respectively and can be closely connected in a manner which comprises, but is not limited to, adhesion. This solution has a simple structure and is easy to achieve.

Figure 1C:
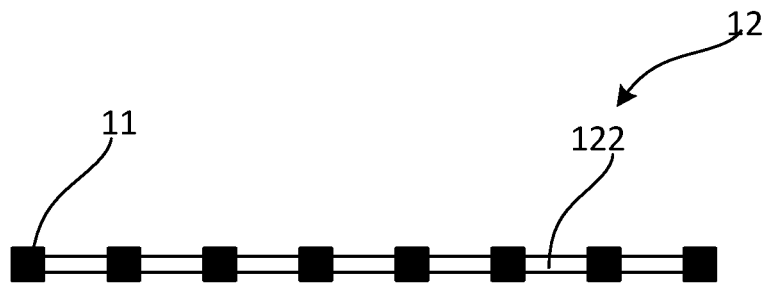
FIG. 1c is a schematic structural diagram of a second display device with adjustable pixel distribution according to an embodiment of the present application.

In another optional implementation manner, as shown in FIG. 1c, the controllable deformable material portion 12 comprises multiple controllable deformable material connection sub-portions 122. The multiple controllable deformable material connection sub-portions 122 are distributed in an array, so as to correspondingly connect the multiple display pixels 11 that are distributed in an array, that is, the multiple display pixels distributed in an array are connected into one piece by using the multiple controllable deformable material connection sub-portions distributed in an array. Optionally, the multiple controllable deformable material connecting sub-portions may be formed in space regions of pixels of a display pixel array according to an actual process, and the multiple controllable deformable material connecting sub-portions and the corresponding display pixels may be connected in a manner which comprises, but is not limited to, abutment and adhesion. Density distribution of the display pixels may be adjusted by controlling deformation of the multiple controllable deformable material connection sub-portions. The structure is simple and easy to implement.

Figure 1D:
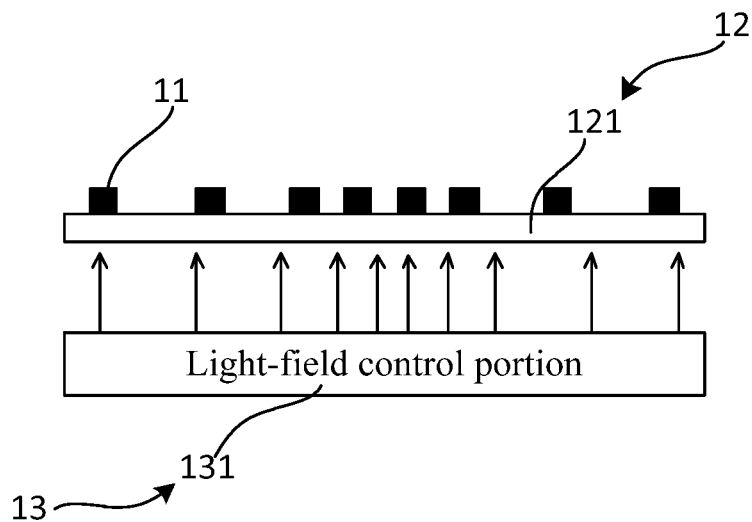
FIG. 1d is a schematic structural diagram of a third display device with adjustable pixel distribution according to an embodiment of the present application.
Figure 1E:
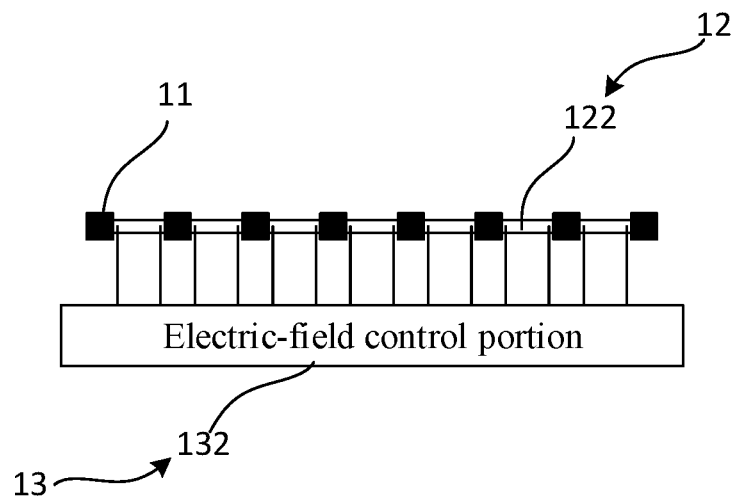
FIG. 1e is a schematic structural diagram of a fourth display device with adjustable pixel distribution according to an embodiment of the present application.

Further, as shown in FIGS. 1d and 1e, the display device may further comprise a deformation control portion 13. The deformation control portion 13 is configured to adjust distribution of the external field acting on the controllable deformable material portion 12, so as to control the controllable deformable material portion 12 to produce corresponding deformation. In this way, when the controllable deformable material portion 12 produces deformation, spacing between the display pixels 11 is adjusted correspondingly, thereby changing density distribution of the display pixels 11, and achieving an effect of giving differentiated display pixel distribution to different regions of the display device according to an actual need.

Optionally, as shown in FIG. 1d, the deformation control portion may comprise a light-field control portion 131. The light-field control portion 131 is configured to adjust distribution of an external light field acting on the controllable deformable material portion 12, so as to control the controllable deformable material portion 12 to produce corresponding deformation. In this way, the controllable deformable material portion 12 may comprise a photostrictive material portion at least prepared from a photostrictive material, for example, the photostrictive material portion may comprise a photostrictive material layer at least prepared from the photostrictive material, or the controllable deformable material portion may comprise multiple photostrictive material connecting sub-portions at least prepared from the photostrictive material. The light-field control portion 131 excites different regions of the controllable deformable material portion 12 to produce deformation differently by changing light field distribution acting on the photostrictive material portion (in FIG. 1*d*, the light field having different intensity distribution and acting on the controllable deformable material portion 12 is represented through arrow density), and the spacing between the display pixels 11 is adjusted correspondingly by the deformation of the controllable deformable material portion 12, thereby changing density distribution of the display pixels 11 and achieving the effect of giving differentiated display pixel distribution to different regions of the display device according to an actual need.

Figure 1F:
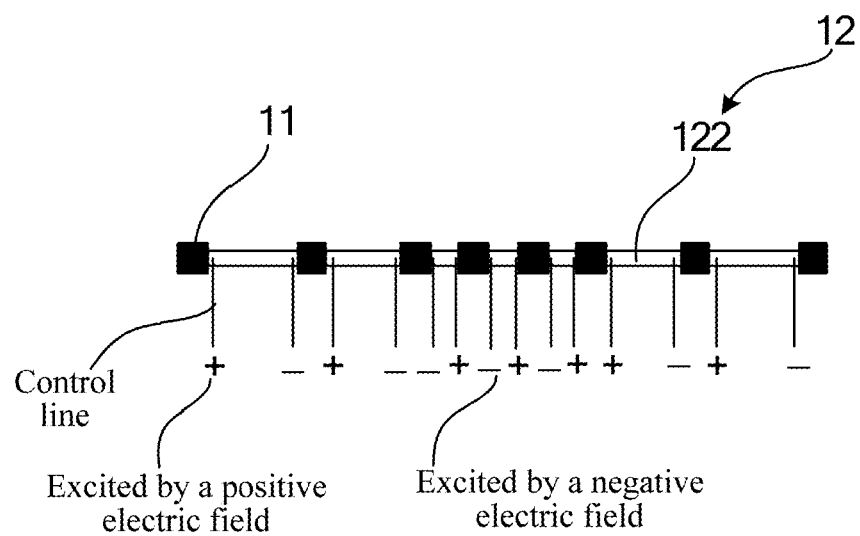
FIG. 1f is an example of a scenario in which a display device adjusts pixel distribution in the case of uneven light field excitation according to an embodiment of the present application.

Optionally, as shown in FIG. 1*e*, the deformation control portion may comprise an electric-field control portion 132. The electric-field control portion 132 is configured to adjust distribution of an external electric field acting on the controllable deformable material portion, so as to control the controllable deformable material portion to produce corresponding deformation. In this case, the controllable deformable material portion 12 may comprise a piezoelectric material portion at least prepared from a piezoelectric material (such as a piezoelectric material layer or a piezoelectric material connecting sub-portion), or the controllable deformable material portion 12 may comprise an EAP portion at least prepared from EAPs (such as an EAP layer or an EAP connecting sub-portion). As shown in FIG. 1*e*, the electric field control portion and the controllable deformable material can be connected through a control line, and the electric field control portion 132 excites different regions of the controllable deformable material portion 12 to produce deformation differently by changing electric field distribution acting on the controllable deformable material portion. If the electric field acting on the controllable deformable material portion 12 is a zero field, the controllable deformable material portion does not produce deformation (might as well be called zero field excitation); if intensity distribution of the electric field acting on the controllable deformable material portion 12 (for example, "+" excited by a positive electric field and "−" excited by a negative electric field shown in FIG. 2*e*) is changed to cause the intensity of the electric field acting on different regions of the controllable deformable material portion 12 to vary, as shown in FIG. 1*f*, in this way, the different regions of the controllable deformable material portion 12 may produce deformation differently, and the spacing between the display pixels 11 is adjusted correspondingly by the deformation of the controllable deformable material portion 12, thereby changing the overall pixel density distribution of the display device and achieving the effect of giving differentiated display pixel distribution to different regions of the display device according to an actual need.

In this embodiment of the present application, the controllable deformed portion and the deformation control portion may be directly connected, and may also be indirectly connected. The deformation control portion may be as a part of the display device, or the deformation control portion may also not be a part of the display device, and the display device may also be connected to the deformation control portion through a reserved pin or interface or the like. The external field acting on the controllable deformable material portion may comprise, but is not limited to, an electric field, a magnetic field, a light field and the like. A hardware or software structure configured to produce the electric field, a hardware or software structure configured to produce the magnetic field, a hardware or software structure configured to produce the light field and the like can be achieved by using corresponding existing technologies according to an actual need, which is no longer repeated herein in this embodiment of the present application.

Figure 1G:
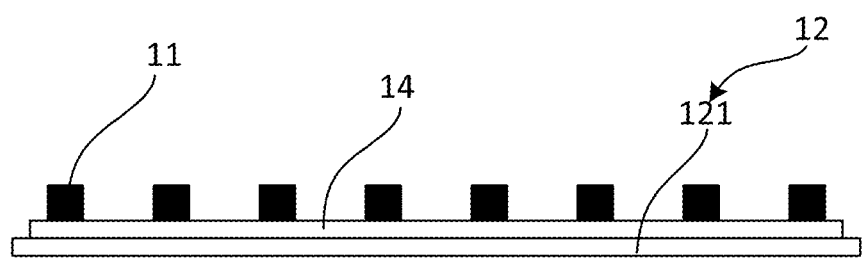
FIG. 1g is a schematic structural diagram of a fifth display device with adjustable pixel distribution according to an embodiment of the present application.
Figure 1H:
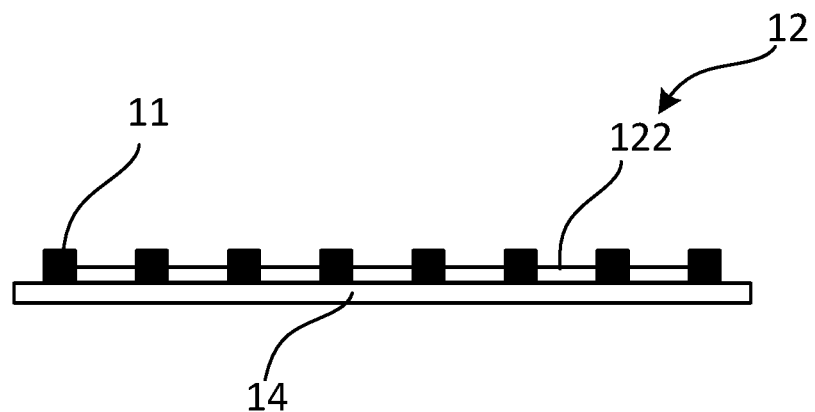
FIG. 1h is a schematic structural diagram of a sixth display device with adjustable pixel distribution according to an embodiment of the present application.

Optionally, the display device may further comprise a flexible substrate. The flexible substrate may comprise, but is not limited to, a plastic flexible substrate having certain flexibility. The shape of the flexible substrate may be changed according to requirements. The display pixels and the controllable deformable material portion may be disposed at the same side or different sides of the flexible substrate. For example, as shown in FIG. 1*g*, the multiple display pixels 11 are connected to one side of a flexible substrate 14, and the controllable deformable material portion (for example, the controllable deformable material layer 121) is connected to the other side of the flexible substrate 14. For example, as shown in FIG. 1*h*, the multiple display pixels 11 are connected to one side of the flexible substrate 14, and the controllable deformable material portion (for example, the controllable deformable material connection sub-portions 122) is connected to a corresponding display pixel and is located at the same side of the flexible substrate 14 as the display pixels 11. According to this solution, the overall pixel density distribution of the display device can be indirectly adjusted by controlling deformation of the display device by the external field acting on the controllable deformable material portion, to achieve adjustable pixel density of the display device, and the shape of the display device can also be flexibly changed by use of the flexible substrate, for example, a plane display device is bent to a particular angle to obtain a curved surface display device, thereby meeting application demands such as diversified image display and decoration.

Figure 1I:
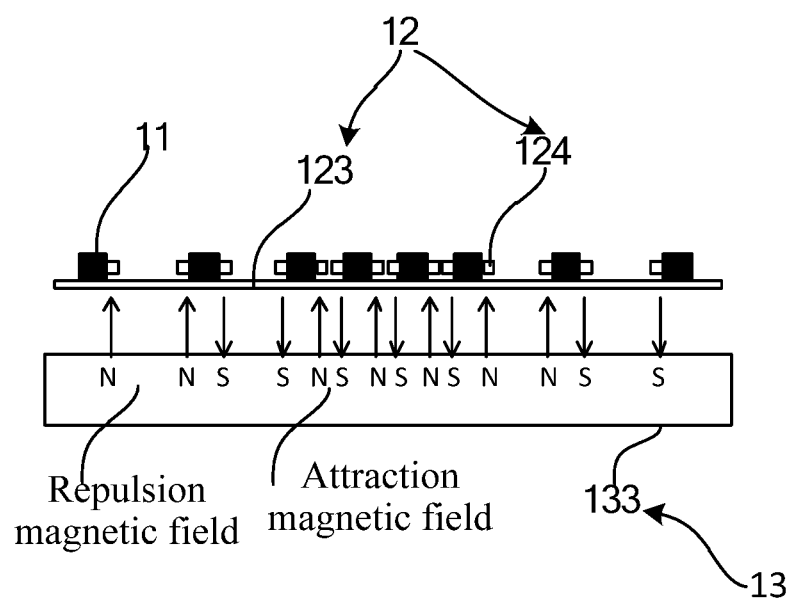
FIG. 1i is a schematic structural diagram of a seventh display device with adjustable pixel distribution according to an embodiment of the present application.

FIG. 1*i* is a schematic structural diagram of a seventh display device with adjustable pixel density according to an embodiment of the present application. In the display device as shown in FIG. 1*i*, the controllable deformable material portion 12 comprises a flexible substrate 123 and multiple permeability magnetic material portions 124; the multiple display pixels 11 are respectively connected to the flexible substrate 123, at least a part of the display pixels 11 are connected to the multiple permeability magnetic material portions 124, the flexible substrate 123 produces corresponding deformation by changing a magnetic field acting on the permeability magnetic material portions 124, and density distribution of the multiple display pixels 11 is correspondingly adjusted through the deformation. For example, a permeability magnetic material portion 124 may be disposed on a side face of each display pixel, and optionally, the display pixel 11 is respectively adhered to the flexible substrate 123 and the permeability magnetic material portion 124. The permeability magnetic material portion may comprise a magnetic pole prepared from a permeability magnetic material, and the permeability magnetic material may comprise, but is not limited to, one or more of a soft magnetic material, a silicon steel sheet, a permalloy, ferrite, an amorphous soft magnetic alloy, and a super-microcrystalline soft magnetic alloy. The permeability magnetic material portion prepared from the soft magnetic material has better permeability, and small residual magnetization after cancellation of the magnetic field, which facilitates next adjustment.

Further, optionally, the deformation control portion 13 in this embodiment of the present application may further comprise a magnetic field control portion 133. The magnetic field control portion 133 is configured to adjust distribution of an external magnetic field acting on the controllable deformable material portion, so as to control the controllable deformable material portion to produce corresponding deformation. For example, when the magnetic field control portion 133 controls the magnetic field (that is, excitation magnetic field) acting on the permeability magnetic material portion 124, as shown in FIG. 1*i*, a like magnetic pole (NN or SS) repulsion magnetic field or an unlike magnetic pole (NS or SN) attraction magnetic field with certain magnetic field strength distribution is applied between adjacent display pixels, the poles may produce a corresponding repelling force or attracting force therebetween, and the magnetic force is transferred to the flexible substrate 123 to make the flexible substrate 123 produce deformation such as expansion and contraction, thereby changing the spacing between the corresponding display pixels and achieving the purpose of adjusting display pixel distribution. This solution achieves adjustable pixel density distribution of the display device in combination with scalable deformation features of the flexible substrate and the magnetic field control principle.

Figure 1J:
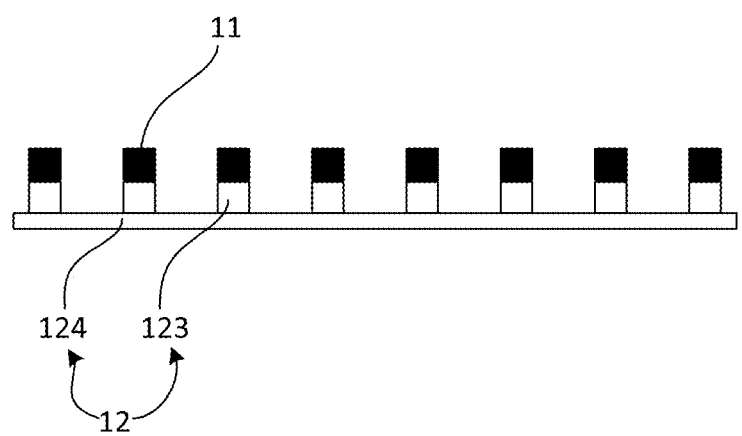
FIG. 1j is a schematic structural diagram of an eighth display device with adjustable pixel distribution according to an embodiment of the present application.

FIG. 1*j* is a schematic structural diagram of an eighth display device with adjustable pixel density according to an embodiment of the present application. In the display device as shown in FIG. 1*j*, the controllable deformable material portion 12 comprises a flexible substrate 123 and multiple permeability magnetic material portions 124; one side of the multiple permeability magnetic material portions 124 is respectively connected to the flexible substrate 123, an opposite face of the multiple permeability magnetic material portions 124 is respectively connected to the multiple display pixels 11 correspondingly, the flexible substrate 123 produces corresponding deformation by changing a magnetic field acting on the permeability magnetic material portions 124, and density distribution of the multiple display pixels 11 is correspondingly adjusted through the deformation. Optionally, the permeability magnetic material portions 124 are adhered to the flexible substrate 123, the display pixels 11 are adhered to the permeability magnetic material portions 124, and when the magnetic field acting on the permeability magnetic material portions 124 changes, the magnetic force is transferred to the flexible substrate 123 to make the flexible substrate 123 produce deformation such as expansion and contraction, thereby achieving the purpose of adjusting display pixel distribution. This solution achieves adjustable pixel density distribution of the display device in combination with scalable deformation features of the flexible substrate and the magnetic field control principle.

In any one of technical solutions provided in the embodiments of the present application, a manner for determining the first display region of the display device is very flexible. For example, the determining a local display region of the display device as a first display region comprises: determining a local region of at least one first image as a first region; and determining a display region, which corresponds to the first region, in the display device as the first display region. According to this solution, the first display region, which is to be adjusted to be denser or sparser, of the display device may be determined according to at least one to-be-displayed first image, which may better meet differentiated requirements for displaying of an image. Specifically, it is found by the inventor of the present application in research related to the present application that, in some scenarios, each region of a frame of an image is of different significance and/or importance to a user, that is, the user may have different degrees of interest in different regions of a displayed image, such as, in a scenario in which a character image is displayed, a user is more interested in a human face than the scenery in the image. To improve a display quality of an image region that a user is more interested in, a first region of at least one first image that is to be displayed may be determined, a display region, which corresponds to at least one first region, of the display device is determined as the first display region, and display pixel distribution of the display device is changed, to cause display pixel density of the first display region of the display device to be larger than display pixel density of another display region. The solution is equivalent to that existing display pixels of the display device are made full use of, and these display pixels are readjusted, to cause more display pixels to be used to display a part that a user is more interested in, and to cause definition or resolution of a displayed image to be differentiated; and an image region that the user is more interested in has relatively high definition or resolution due to relatively dense display pixels, thereby displaying a local part of the image in high resolution, and better meeting diversified actual application requirements of users.

Within a preset permitted staying duration of vision of human eyes, display pixel distribution of a display device is changed at least once, and after each change, the display device displays a first image. Image content of first regions of different first images is related. It should be noted that, image content of the first regions of the different first images is related means that first regions of first images displayed by the display device many times in a time division manner have a certain degree of correlation in their image content. The correlation degree may comprise, but is not limited to, the following cases: parts of different sampled images that correspond to a same-source image, parts of different focus images in different viewing angles that correspond to same light-field information, parts whose content is of mirror symmetry, same content, and the like. According to different requirements for overlapped displaying of different images, the first display regions, which correspond to the first regions of the first images and are displayed in a time division manner, may be the same or different. The first display regions, which are configured to display related image content, of the display device are determined, and display pixel density of the first display regions is adjusted to be dense or sparse together, which helps improve definition of a local part of related content in a second image that is displayed in an overlapped manner, and improves a display quality of a local part of an actually displayed image by making full use of the existing display pixels of the display device.

A manner of acquiring the first region of at least one first image may be determined according to an actual need, and is very flexible.

In an optional implementation manner, the first region of at least one first image may be determined according to information of a region of interest (ROI), that is, ROI information is acquired; and the local region of at least one first image is determined as the first region according to the ROI information. The ROI region of a first image may comprise, but is not limited to, one or more of the following: at least one region, selected by a user, of the first image (that is, a user selection region of the first image), at least one region, gazed by a user, of the first image (that is, a user gaze region of the first image), and an ROI obtained by the display control apparatus by automatically detecting the first image. According to this solution, according to the ROI, the first region of the image is determined. The determined first region may be a region corresponding to the ROI, or the determined first region may be a region corresponding to a non-ROI, to cause determination of the first region to better fit with actual demands of users, which can better meet personalized application requirements of users.

In another optional implementation manner, the first region of at least one first image may be determined according to a result of an image analysis, that is, an image analysis is performed on at least one first image; and the local region of at least one first image is determined as the first region according to a result of the image analysis. For example, human face recognition is performed at least one first image that is to be displayed, and according to a recognition result, a human face region is determined as the first region of a corresponding first image. According to this solution, the first region of the corresponding first image may be determined according to the result of the image analysis of the to-be-displayed first image, to cause determination of the first region to be more intelligent, thereby improving efficiency and universality of the determination of the first region.

Further, the first region of any one of the first images may comprise one or more first sub-regions. The first sub-region comprises at least a local region, whose display definition needs to be relatively increased or decreased, of the first image. In a case in which the first region comprises multiple first sub-regions, the multiple first sub-regions may be continuously distributed in the first image, for example, boundaries of the multiple first sub-regions are adjacent; or the multiple first sub-regions may be dispersed in the first image, for example, all boundaries of the multiple first sub-regions are not adjacent, or a boundary of at least one of the multiple first sub-regions is not adjacent to boundaries of the other first sub-regions. All display sub-regions, which are configured to display the multiple determined first sub-regions, in the display device are determined, and the determined display sub-regions are the first display region of the display device. Adjusted display pixel density of multiple first sub-regions comprised in a first display region of a display device may be the same, and it may also be that display pixel density of at least two first sub-regions is different. Display pixel density of a single first sub-region may be even or uneven. An implementation manner is very flexible, which is not limited in this embodiment of the present application. According to this solution, flexibility of determining of the first region, whose image display definition, in the first image needs to be adjusted, is improved, and diversified application requirements of users may be better met.

In a case in which there are multiple first images, it may be that the first regions of the first images are respectively determined, and it may also be that the first region of a part (for example, one) of the first images is determined, and then a region, which has related content, of another first image is determined as the first region of the another first image. An implementation manner is very flexible.

On the basis of any technical solution provided in this embodiment of the present application, the display control method may further comprise acquiring multiple first images that are related in content but different in at least a local part.

The acquired multiple first images are displayed by a display device within a preset permitted staying duration of vision of human eyes in a time division manner. The displayed first images are overlapped in the human eyes and a second image at least a local part of which has relatively high resolution is obtained, thereby improving definition of at least a local part of the second image obtained by overlapping by making full use of the display pixels of the display device and a feature of duration of vision of human eyes.

A specific manner for acquiring multiple first images that are related in content but different in at least a local part is very flexible, which is not limited in the embodiments of the present application.

For example, the acquiring multiple first images that are related in content but different in at least a local part comprises the following: sampling may be performed on a captured high-resolution source image in different manners, a first image is obtained by performing sampling on each odd index pixel of the source image, another first image is obtained by performing sampling on each even index pixel of the source image, the two first images are displayed by a display device, whose display pixel density is in different states, within a preset permitted staying duration of vision of human eyes, display resolution of the two displayed first images is different in a sub-pixel level, and therefore, a relatively-high-resolution second image is obtained by displaying in human eyes in an overlapped manner. According to this solution, a probability that there is a sub-pixel difference between different first images may be increased.

For example, the acquiring multiple first images that are related in content but different in at least a local part comprises acquiring multiple focus images that are in different viewing angles and respectively corresponding to a light-field information. A light-field display technology may be applied, but is not limited to, naked-eye 3D (pseudo holographic) display. The display principle thereof is to enable, based on restoring light-field information of a display scenario (for example, light distribution information of a display scenario), a user to observe displayed content in a most natural manner of using naked eyes. The effect is like watching the scenery through a window. However, actually, the foregoing feature of flexible displaying is at the cost of display resolution. That is, based on a same display pixel condition, space resolution of an image displayed by using a light-field display technology is lower than space resolution of a traditional image. A problem of image display resolution is especially prominent in the light-field display technology, and has become a pressing problem in promotion and application of the light-field display technology. Optionally, the feature of the duration of vision of human eyes may be used, and within a preset permitted staying duration of vision of human eyes, multiple focus images that are in different viewing angles and respectively corresponding to light-field information are displayed by a display device in a time division manner. The focus images are displayed as a second image in an overlapped manner in human eyes. Light information of the second image can be restored to a certain extent. For human eyes, in some scenarios, the second image is like a three-dimensional light-field image formed by overlapping images having multiple viewing angles and watched by naked eyes of human. However, in time division display control, display pixel distribution of the display device is changed, to cause the display pixel distribution of the display device to be different when the display device displays a first image at least twice within a preset permitted staying duration of vision of human eyes, and to adjust resolution and definition of a local part of the second image displayed in human eyes in an overlapped manner based on the feature of the duration of vision of human eyes, thereby improving utilization of pixels of the display device and a display quality of at least a local part of an image, and better meeting diversified actual application demands of users.

It may be understood by a person skilled in the art that, in any method of the specific implementation manners of the present application, sequence numbers of the steps do not mean execution sequences. The execution sequences of the steps should be determined according to functions and internal logic of the steps, and should not be construed as any limitation on the implementation processes of the specific implementation manners of the present invention.

Figure 4:
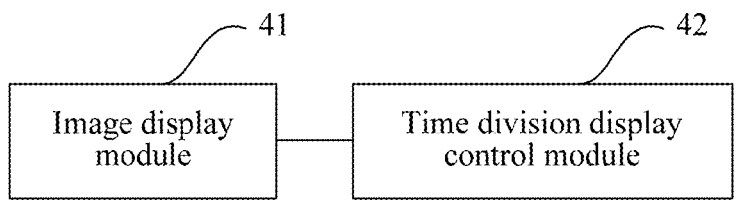
FIG. 4 is a logical block diagram of a time division display control apparatus according to an embodiment of the present application.

FIG. 4 is a logical block diagram of a time division display control apparatus according to an embodiment of the present application. As shown in FIG. 4, a time division display control apparatus provided in this embodiment of the present application comprises an image display module 41 and a time division display control module 42.

The image display module 41 is configured to display a first image by a display device.

The time division display control module 42 is configured to change display pixel distribution of the display device at least once within a preset permitted staying duration of vision of human eyes and display the first image by the display device changed each time, to cause the displayed first images to be displayed in human eyes as a second image in an overlapped manner.

The time division display control apparatus provided in this embodiment of the present application controls a display device to display multiple first images within a preset permitted staying duration of vision of human eyes, and by using a feature of duration of vision of human eyes, the first images formed on retinas of human eyes may be kept within a preset permitted staying duration of vision. In addition, when the display device displays a corresponding first image in a time division manner, display pixel distribution of the display device is different. Therefore, local resolution of the first images displayed by the display device within the preset staying duration of vision of human eyes is varied, which is equivalent to that, by adjusting display pixel distribution of the display device, the first images obtained due to at least one change are made different in a sub-pixel level, and the first images displayed by the display device in the time division manner are displayed in human eyes in an overlapped manner and a second image is obtained. Compared with resolution of a single first image, overall resolution of the second image is increased. However, based on the feature of the duration of vision of human eyes, human eyes may not recognize such a change. Therefore, it is equivalent to that human eyes see a relatively-high-resolution second image, thereby improving utilization of a display pixel of a display device and a display quality of at least a local part of an image and better meeting diversified actual application demands of users.

A device manifestation form of the time division display control apparatus is not limited, for example, the time division display control apparatus may be an independent component, and the component cooperatively communicates with a display array; or the time division display control apparatus may be integrated into a display device as a functional module, which is not limited in this embodiment of the present application.

Figure 5:
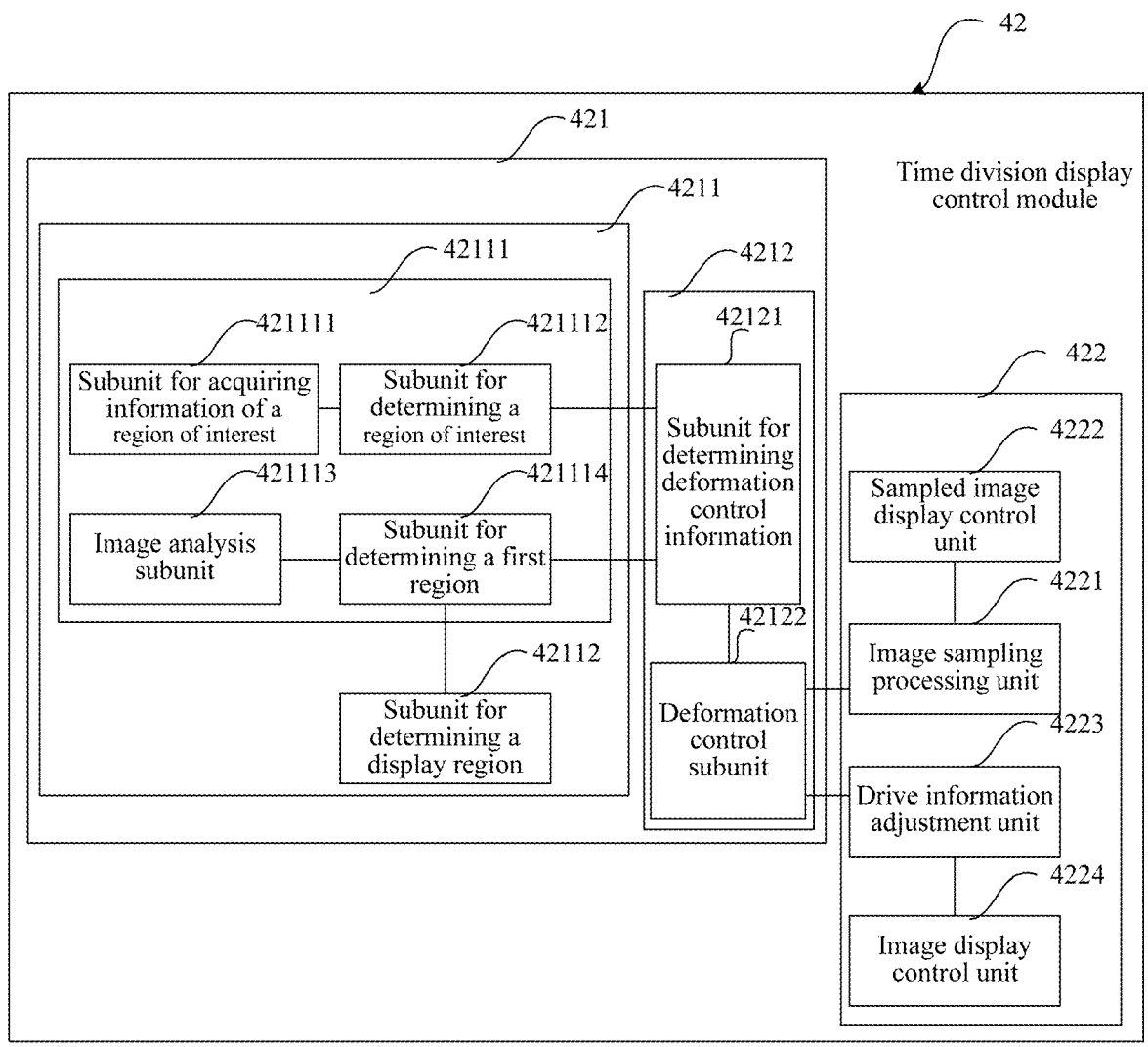
FIG. 5 is a logical block diagram of a time division display control module according to an embodiment of the present application.

Optionally, as shown in FIG. 5, the time division display control module 42 comprises a sub-module 421 for changing display pixel distribution and a display control sub-module 422. The sub-module 421 for changing display pixel distribution is configured to change display pixel distribution of the display device at least once within the preset permitted staying duration of vision of human eyes; and the display control sub-module 422 is configured to display, within the preset permitted staying duration of vision of human eyes, the first image by the display device changed each time.

Optionally, the display control sub-module 422 comprises an image sampling processing unit 4221 and a sampled image display control unit 4222. The image sampling processing unit 4221 is configured to perform, within the preset permitted staying duration of vision of human eyes and according to actual location information of a display pixel in the changed display device, sampling processing on the first image that is to be displayed; and the sampled image display control unit 4222 is configured to control, within the preset permitted staying duration of vision of human eyes, the changed display device to display the first image on which the sampling processing is performed. In this solution, according to an actual need, it may be determined whether it is needed to perform sampling and adaption processing on the first image that is to be displayed by the display device according to an actual space location of a display pixel of the changed display device. If it is needed, sampling processing may be performed on the first image that is to be displayed by the display device according to actual location information of the display pixel of the changed display device, and therefore, on the basis of differentiated display definition of different regions of the first image, display effects such as that display ratios of sizes, shapes, and the like of different regions of the first image actually displayed by an adjusted display device match display ratios of sizes, shapes, and the like of corresponding regions of the first image before processing, may be achieved. In this case, it is convenient to display, in human eyes in an overlapped manner, first images that are displayed in different states of display pixel distribution of the display device, thereby improving definition of at least a local part of the second image that is displayed in the overlapped manner and a display quality of an image, and better meeting diversified application requirements of users.

Optionally, the display control sub-module 422 comprises a drive information adjustment unit 4223 and an image display control unit 4224. The drive information adjustment unit 4223 is configured to adjust, within the preset permitted staying duration of vision of human eyes and according to actual location information of a display pixel in the changed display device, drive information of the first image that is to be displayed; and the image display control unit 4224 is configured to control, within the preset permitted staying duration of vision of human eyes, the changed display device to display the corresponding first image according to the adjusted drive information. In this solution, according to an actual need, it may be determined whether it is required to make a drive adaption adjustment to a scanning drive manner of the first image that is to be displayed by the display device according to an actual space location of the display pixel of the changed display device. If it is needed, a drive adaption adjustment may be made to the scanning drive manner of the display device according to the actual space location of the display pixel of the changed display device, and therefore, on the basis of differentiated display definition of different regions of the first image displayed by the changed display device, display effects such as that display ratios of different regions of the first image actually displayed by the changed display device match actual ratios of corresponding regions of the first image, may be achieved. In this case, it is convenient to display, in human eyes in an overlapped manner, first images that are displayed in different states of display pixel distribution of the display device, thereby improving definition of at least a local part of the second image that is displayed in the overlapped manner and a display quality of an image, and better meeting diversified application requirements of users.

In another optional implementation manner, multiple display control methods, such as sampling adaption processing is performed on a first image or a adaption adjustment is made to drive information of the first image, may also be combined to control displaying of an image, so as to achieve a better image display effect and improve user experience, which is not repeated again.

Optionally, the sub-module 421 for changing display pixel distribution comprises a unit 4211 for determining a display region and a unit 4212 for changing display pixel distribution. The unit 4211 for determining a display region is configured to determine a local display region of the display device as a first display region; and the unit 4212 for changing display pixel distribution is configured to change display pixel distribution of the first display region at least once. According to this solution, it may be determined that a local display region of a display device is a display region with relatively large or small display pixel density according to an actual need, and based on this, display pixels of the display device are readjusted.

Optionally, the unit 4212 for changing display pixel distribution comprises a subunit 42121 for determining deformation control information and a deformation control subunit 42122. The subunit 42121 for determining deformation control information is configured to determine deformation control information of a controllable deformable material portion of the display device according to the first display region; and the deformation control subunit 42122 is configured to change the display pixel distribution of the first display region according to the deformation control information. Optionally, the controllable deformable material portion is prepared from at least one or more of the following controllable deformable materials: a piezoelectric material, an electroactive polymer, a photostrictive material, and a magnetostrictive material. According to this solution, the display pixel distribution of the display device is changed by controlling deformation of the controllable deformable material portion. The solution is simple and easy to implement.

Optionally, the unit 4211 for determining a display region comprises a subunit 42111 for determining an image region and a subunit 42112 for determining a display region. The subunit 42111 for determining an image region is configured to determine a local region of at least one first image as a first region; and the subunit 42112 for determining a display region is configured to determine a display region, which corresponds to the first region, in the display device as the first display region. The solution is equivalent to that existing display pixels of the display device are made full use of, and these display pixels are readjusted, to cause more display pixels to be used to display a part that a user is more interested in, and to cause definition or resolution of a displayed image to be distributed in a differentiated manner; and an image region that the user is more interested in has relatively high definition or resolution due to relatively dense display pixels, thereby displaying a local part of the image in high resolution and better meeting diversified actual application requirements of users.

Optionally, image content of first regions of different first images are related. The solution helps improve definition of a local part of related content in a second image that is displayed in an overlapped manner, and improves a display quality of a local part of an actually displayed image by making full use of existing display pixels of the display device.

Optionally, the subunit 42111 for determining an image region comprises a subunit 421111 for acquiring information of an ROI and a subunit 421112 for determining an ROI. The subunit 421111 for acquiring information of an ROI is configured to acquire information of an ROI; and the subunit 421112 for determining an ROI is configured to determine the local region of at least one first image as the first region according to the information of the ROI. According to this solution, according to the ROI, the first region of the image is determined. The determined first region may be a region corresponding to the ROI, or the determined first region may be a region, corresponding to a non-ROI, of the image, to cause determination of the first region to better fit with actual demands of users, which can better meet personalized application requirements of users.

Optionally, the subunit 42111 for determining an image region comprises an image analysis subunit 421113 and a subunit 421114 for determining a first region. The image analysis subunit 421113 is configured to perform an image analysis on at least one first image; and the subunit 421114 for determining a first region is configured to determine the local region of at least one first image as the first region according to a result of the image analysis. According to this solution, the first region of the corresponding first image may be determined according to the result of the image analysis of the to-be-displayed first image, to cause determination of the first region to be more intelligent, thereby improving efficiency and universality of the determination of the first region.

Figure 6:
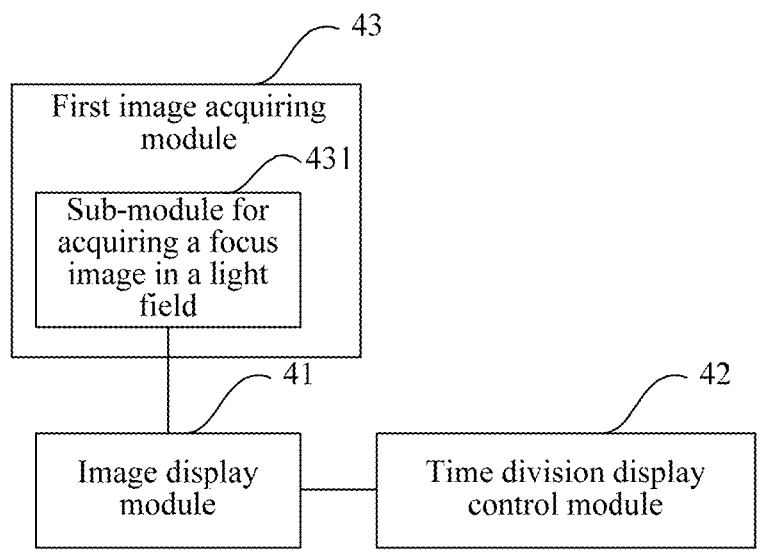
FIG. 6 is a logical block diagram of another time division display control apparatus according to an embodiment of the present application.

Optionally, as shown in FIG. 6, the time division display control apparatus further comprises a first image acquiring module 43. The first image acquiring module 43 is configured to acquire multiple first images that are related in content but different in at least a local part. According to this solution, definition of at least a local part of a second image obtained by overlapping is improved by making full use of display pixels of a display device and a feature of duration of vision of human eyes.

Optionally, the first image acquiring module 43 comprises a sub-module 431 for acquiring a focus image in a light field. The sub-module 431 for acquiring a focus image in a light field is configured to acquire multiple focus images that are in different viewing angles and respectively corresponding to light-field information. The solution helps restore displaying of a light field of an image in a time division display control manner.

Figure 7:
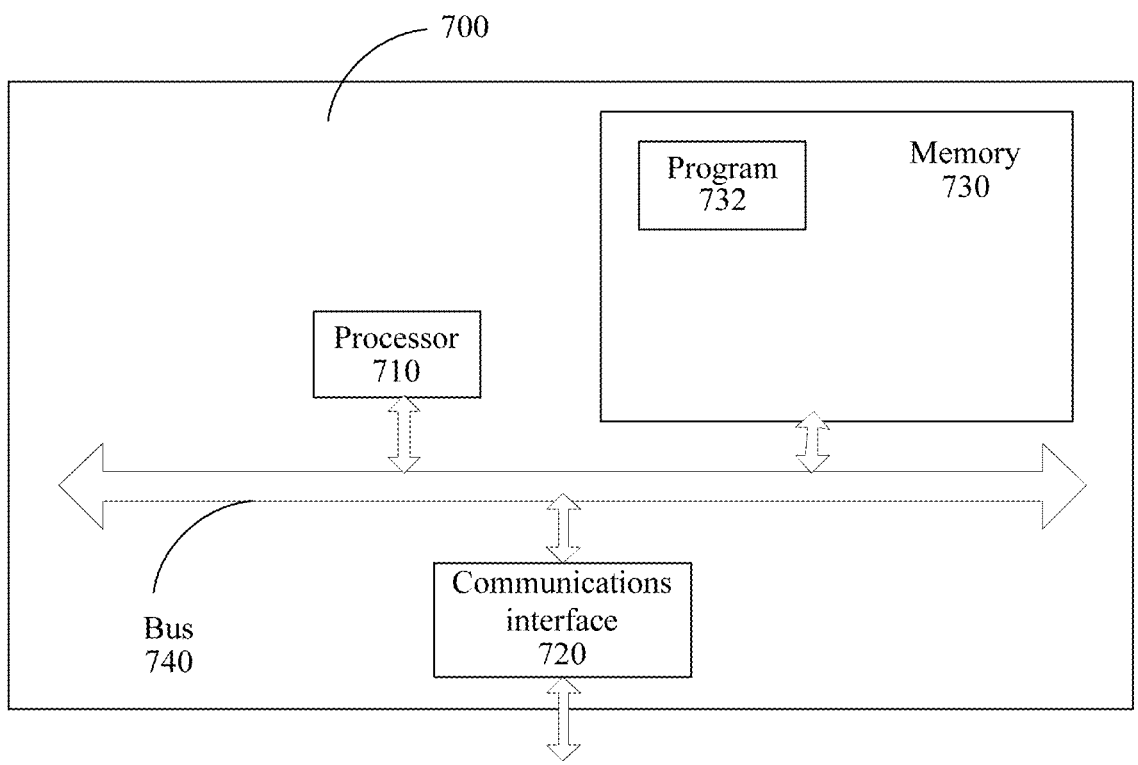
FIG. 7 is a logical block diagram of another time division display control apparatus according to an embodiment of the present application.

FIG. 7 is a logical block diagram of another time division display control apparatus according to an embodiment of the present application. A specific implementation manner of a time division display control apparatus 700 is not limited by a specific embodiment of the present application. As shown in FIG. 7, the time division display control apparatus 700 may comprise:

a processor 710, a communications interface 720, a memory 730, and a communications bus 740.

The processor 710, the communications interface 720, and the memory 730 communicate with each other through the communications bus 740.

The communications interface 720 is configured to communicate with a device having a communications function, an external light source, or the like.

The processor 710 is configured to execute a program 732, and specifically, may execute a related step in any one of the foregoing embodiments of the light capturing control method.

For example, the program 732 may comprise program code. The program code comprises computer operation instructions.

The processor 710 may be a central processing unit (CPU) or an application specific integrated circuit (ASIC), or may be configured as one or more integrated circuits that implement the embodiments of the present application.

The memory 730 is configured to store the program 732. The memory 730 may comprise a random access memory (RAM), and may also comprise a non-volatile memory, for example, at least one magnetic disk storage.

For example, in an optional implementation manner, the processor 710 may execute the following steps by executing the program 732: a first image is displayed by a display device; and display pixel distribution of the display device is changed at least once within a preset permitted staying duration of vision of human eyes and the first image is displayed by the display device changed each time, to cause the displayed first images to be displayed in human eyes as a second image in an overlapped manner.

In another optional implementation manner, the processor 710 may also execute a step referred in any one of the foregoing other embodiments by executing the program 732, which is not repeated herein.

Reference can be made to corresponding description in the corresponding steps, modules, sub-modules and units in the foregoing embodiments for specific implementation of the steps in the program 632, which is not repeated herein. Those skilled in the art can clearly understand that, reference can be made to the corresponding process description in the method embodiments for the devices described above and the specific working procedures of the modules, and will not be repeated herein in order to make the description clear and concise.

Figure 8:
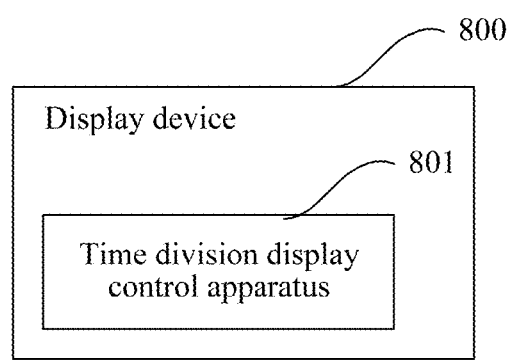
FIG. 8 is a logical block diagram of a display device according to an embodiment of the present application.

FIG. 8 is a logical block diagram of a display device according to an embodiment of the present application. As shown in FIG. 8, display pixel distribution of a display device 800 provided in this embodiment of the present application is adjustable, and the display device 800 may comprise any time division display control apparatus 801 provided in the embodiments of the present application.

A flexible display device described as above may be used as the display device with adjustable display pixel distribution, or the display device with adjustable display pixel distribution may comprise multiple display pixels distributed in array, and a controllable deformable material portion that is respectively connected to the multiple display pixels, where the controllable deformable material portion may produce deformation under the action of an external field, and correspondingly adjusts density distribution of the multiple display pixels by the deformation; and the external field is controlled by the time division display control apparatus.

For an optional structure of the display device with adjustable display pixel distribution, reference may be made to the corresponding disclosure of FIG. 1b to FIG. 1j. The time division display control apparatus may directly control the external field to control deformation of the controllable deformable material portion, thereby changing distribution of pixel points of the display device; the time division display control apparatus may indirectly control the external field by controlling the deformation control portion, to cause the controllable deformable material portion to produce corresponding deformation to correspondingly change distribution of pixel points of the display device; or the like. A physical connection manner of the display pixels and the controllable deformable portion may be determined according to an actual need as long as the distribution of the pixel points of the display device may be adjusted when the deformation material portion produces deformation, which is not limited in this embodiment of the present application.

For a specific implementation manner, reference may be made to above corresponding description, which is not repeated herein.

For the description of structures, working mechanisms, and the like of the time division display control apparatus, reference may be made to the disclosure of other parts of the embodiments of the present application, which is no longer repeated herein.

In the various embodiments of the present application, the serial numbers and/or sequence numbers of the embodiments are merely for the convenience of description, and do not imply the preference among the embodiments. Particular emphasis is put on the description about each embodiment, and reference can be made to relevant description of other embodiments for the content not detailed in an embodiment. Reference can be made to the description about the corresponding method embodiments for related description about the implementation principle or process of relevant apparatus, device or system embodiments, which is not repeated herein.

It can be appreciated by those of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for a specific application, but such implementation should not be construed as a departure from the scope of the present application.

If the function is implemented in the form of a software functional unit and is sold or used as an independent product, the product can be stored in a non-transitory computer-readable storage medium. Based on such understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing storage medium comprises various mediums capable of storing program code, such as, a USB flash drive, a removable hard disk, a read-only memory (ROM), a random access memory (RAM), a magnetic disk, or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one implementation may be used in one or more of other implementations in the same or similar manner and combined with a feature in another implementation manner, or replace a feature in another implementation.

It should be emphasized that, terms "comprise/include" used herein refer to existence of a feature, an element, a step, or a component, but do not exclude existence or addition of one or more of other features, elements, steps, or components.

Finally, it should be noted that, the foregoing implementations are only used to describe the present application, but not to limit the present application. Those of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. A display control method, comprising:
    displaying a first image by a display device; and
    changing display pixel distribution of the display device more than two times within a preset permitted staying duration of vision of human eyes, and displaying a plurality of first images by the display device each time the display pixel distribution is changed, to cause the displayed plurality of first images to be displayed to human eyes as a second image in an overlapped manner,
    wherein the display pixel distribution of the display device is changed from an even distribution to a first uneven distribution, and is further changed to a second uneven distribution different from the first uneven distribution,
    wherein the preset permitted staying duration of vision of human eyes is determined based on a staying duration of vision of human eyes, and the staying duration of vision of human eyes is a certain duration in which an impression of an optic nerve on an object remains when the object is removed, wherein an image of the object is formed on retinas of human eyes when the human eyes observe the object, and the image is transmitted to a human brain by the optic nerve to cause a person to sense the image of the object, and
    wherein the plurality of first images is displayed by the display device within the preset permitted staying duration of vision of human eyes in a time division manner, wherein each of the plurality of first images is formed on the retinas of human eyes at a different time, each of the plurality of first images is remained on the retinas of human eyes within the preset permitted staying duration of vision of human eyes, such that the plurality of first images are overlapped to obtain the second image,
    wherein the changing display pixel distribution of the display device more than two times comprises:
    determining a local region of the first image as a first sub-region;
    determining a display region, which corresponds to the first sub-region, in the display device as a first display sub-region of the first image; and
    changing only display pixel distribution of the first display sub-region of the first image more than two times.

2. The method of claim 1, wherein the displaying a plurality of first images by the display device each time the display pixel distribution is changed, comprises:
    performing, according to actual location information of a display pixel in the changed display device, sampling processing on the plurality of first images that is to be displayed; and
    controlling the display device to display, with the changed display pixel distribution, the plurality of first images on which the sampling processing is performed.

3. The method of claim 1, wherein the displaying a plurality of first images by the display device each time the display pixel distribution is changed, comprises:
    adjusting, according to actual location information of a display pixel in the display device, drive information of the plurality of first images that is to be displayed; and
    controlling the display device to display the corresponding plurality of first images according to the adjusted drive information with the changed display pixel distribution.

4. The method of claim 1, wherein changing display pixel distribution of the display device more than two times comprises:
    determining deformation control information of a controllable deformable material portion of the display device according to the first display sub-region of the first image; and
    changing the display pixel distribution of the first display sub-region of the first image according to the deformation control information.

5. The method of claim 4, wherein the controllable deformable material portion is prepared from at least one of the following controllable deformable materials: a piezoelectric material, an electroactive polymer, a photostrictive material and a magnetostrictive material.

6. The method of claim 1, wherein image content of first sub-regions of different first images are relevant.

7. The method of claim 1, wherein the determining a local region of the first image as a first sub-region comprises:
    acquiring information of a region of interest (ROI); and
    determining the local region of the first image as the first sub-region according to the information of the ROI.

8. The method of claim 1, wherein the determining a local region of the first image as a first sub-region comprises:
    performing an image analysis on the first image; and
    determining the local region of the first image as the first sub-region according to a result of the image analysis.

9. The method of claim 1, further comprising: acquiring multiple first images that are related in content but different in at least a local part.

10. The method of claim 9, wherein the acquiring multiple first images comprises acquiring multiple focus images that are in different viewing angles and respectively corresponding to light-field information.

11. A display control apparatus, comprising:
    an image display module, configured to display a first image by a display device; and
    a time division display control module, configured to change display pixel distribution of the display device more than two times within a preset permitted staying duration of vision of human eyes, and display a plurality of first images by the display device each time the display pixel distribution is changed, to cause the displayed plurality of first images to be displayed to human eyes as a second image in an overlapped manner,
    wherein the display pixel distribution of the display device is changed from an even distribution to a first uneven distribution, and is further changed to a second uneven distribution different from the first uneven distribution,
    wherein the preset permitted staying duration of vision of human eyes is determined based on a staying duration of vision of human eyes, and the staying duration of vision of human eyes is a certain duration in which an impression of an optic nerve on an object remains when the object is removed, wherein an image of the object is formed on retinas of human eyes when the human eyes observe the object, and the image is transmitted to a human brain by the optic nerve to cause a person to sense the image of the object, and wherein the plurality of first images is displayed by the display device within the preset permitted staying duration of vision of human eyes in a time division manner, wherein each of the plurality of first images is formed on the retinas of human eyes at a different time, each of the plurality of first images is remained on the retinas of human eyes within the preset permitted staying duration of vision of human eyes, such that the plurality of first images are overlapped to obtain the second image, wherein the time division display control module is configured to:

determining a local region of the first image as a first sub-region;

determining a display region, which corresponds to the first region, in the display device as a first display sub-region of the first image; and change only display pixel distribution of the first display sub-region of the first image more than two times.

12. A non-transitory computer readable storage apparatus, comprising at least one executable instruction, which, when executed, causes a display control apparatus to perform operations comprising:

displaying a first image by a display device; and changing display pixel distribution of the display device more than two times within a preset permitted staying duration of vision of human eyes, and displaying a plurality of first images by the display device each time the display pixel distribution is changed, to cause the displayed plurality of first images to be displayed to human eyes as a second image in an overlapped manner, wherein the display pixel distribution of the display device is changed from an even distribution to a first uneven distribution, and is further changed to a second uneven distribution different from the first uneven distribution, wherein the preset permitted staying duration of vision of human eyes is determined based on a staying duration of vision of human eyes, and the staying duration of vision of human eyes is a certain duration in which an impression of an optic nerve on an object remains when the object is removed, wherein an image of the object is formed on retinas of human eyes when the human eyes observe the object, and the image is transmitted to a human brain by the optic nerve to cause a person to sense the image of the object, and wherein the plurality of first images is displayed by the display device within the preset permitted staying duration of vision of human eyes in a time division manner, wherein each of the plurality of first images is formed on the retinas of human eyes at a different time, each of the plurality of first images is remained on the retinas of human eyes within the preset permitted staying duration of vision of human eyes, such that the plurality of first images are overlapped to obtain the second image, wherein the changing display pixel distribution of the display device more than two times comprises:

determining a local region of the first image as a first sub-region;

determining a display region, which corresponds to the first sub-region, in the display device as a first display sub-region of the first image; and changing only display pixel distribution of the first display sub-region of the first image more than two times.

13. A display control apparatus, comprising a processor and a memory, the memory storing computer executable instructions which, when executed, cause the display control apparatus to perform operations comprising:

displaying a first image by a display device; and changing display pixel distribution of the display device more than two times within a preset permitted staying duration of vision of human eyes, and displaying a plurality of first images by the display device each time the display pixel distribution is changed, to cause the displayed plurality of first images to be displayed to human eyes as a second image in an overlapped manner, wherein the display pixel distribution of the display device is changed from an even distribution to a first uneven distribution, and is further changed to a second uneven distribution different from the first uneven distribution manner, wherein the preset permitted staying duration of vision of human eyes is determined based on a staying duration of vision of human eyes, and the staying duration of vision of human eyes is a certain duration in which an impression of an optic nerve on an object remains when the object is removed, wherein an image of the object is formed on retinas of human eyes when the human eyes observe the object, and the image is transmitted to a human brain by the optic nerve to cause a person to sense the image of the object, and wherein the plurality of first images is displayed by the display device within the preset permitted staying duration of vision of human eyes in a time division manner, wherein each of the plurality of first images is formed on the retinas of human eyes at a different time, each of the plurality of first images is remained on the retinas of human eyes within the preset permitted staying duration of vision of human eyes, such that the plurality of first images are overlapped to obtain the second image, wherein the changing display pixel distribution of the display device more than two times comprises:

determining a local region of the first image as a first sub-region;

determining a display region, which corresponds to the first sub-region, in the display device as a first display sub-region of the first image; and changing only display pixel distribution of the first display sub-region of the first image more than two times.

14. The apparatus of claim 13, wherein the operations further comprise:

performing, within the preset permitted staying duration of vision of human eyes and according to actual location information of a display pixel in the display device, sampling processing on the plurality of first images that is to be displayed; and controlling, within the preset permitted staying duration of vision of human eyes, the display device to display the plurality of first images on which the sampling processing is performed.

15. The apparatus of claim 13, wherein the operations further comprise:

adjusting within the preset permitted staying duration of vision of human eyes and according to actual location information of a display pixel in the display device, drive information of the plurality of first images that is to be displayed; and controlling, within the preset permitted staying duration of vision of human eyes, the display device to display the corresponding plurality of first images according to the adjusted drive information.

16. The apparatus of claim 13, wherein the operations further comprise:
determining deformation control information of a controllable deformable material portion of the display device according to the first display sub-region of the first image; and
changing the display pixel distribution of the first display sub-region of the first image according to the deformation control information.

17. The apparatus of claim 16, wherein the controllable deformable material portion is prepared from at least one of the following controllable deformable materials: a piezoelectric material, an electroactive polymer, a photostrictive material and a magnetostrictive material.

18. The apparatus of claim 13, wherein image content of first sub-regions of different first images are relevant.

19. The apparatus of claim 13, wherein the operations further comprise:
acquiring information of a region of interest (ROI); and
determining the local region of the first image as the first sub-region according to the information of the ROI.

20. The apparatus of claim 13, wherein the operations further comprise:
performing an image analysis on the first image; and
determining the local region of the first image as the first sub-region according to a result of the image analysis.

21. The apparatus according to claim 13, wherein the operations further comprise:
acquiring multiple first images that are related in content but different in at least a local part.

22. The apparatus of claim 21, wherein the operations further comprise:
acquiring multiple focus images that are in different viewing angles and respectively corresponding to light-field information.

23. A display device having an adjustable display pixel distribution, comprising the display control apparatus of claim 13.

24. The display device of claim 23, further comprising:
multiple display pixels distributed in an array; and
a controllable deformable material portion that is respectively connected to the multiple display pixels, wherein the controllable deformable material portion produces deformation under an action of an external field, and correspondingly adjusts density distribution of the multiple display pixels by the deformation, and wherein the external field is controlled by the display control apparatus.

* * * * *

UNITED STATES PATENT AND TRADEMARK OFFICE
CERTIFICATE OF CORRECTION

PATENT NO.         : 11,170,679 B2
APPLICATION NO.    : 15/543172
DATED              : November 9, 2021
INVENTOR(S)        : Liang Zhou and Lin Du Page 1 of 1

It is certified that error appears in the above-identified patent and that said Letters Patent is hereby corrected as shown below:

In the Specification

Column 1, Line 8-14:
"The present international patent cooperative treaty (PCT) application claims priority to and benefit of Chinese Patent Application No. 201510024380.7, filed on Jan. 16, 2015, and entitled 'Time Division Display Control Methods and Apparatuses and Display Devices', which is hereby incorporated into the present international PCT application by reference herein in its entirety." should read -- This application is a National Phase Application of International Application No. PCT/CN2016/070336, filed on January 7, 2016, which claims priority to and benefit of Chinese Patent Application No. 201510024380.7, filed on January 16, 2015, and entitled "Time Division Display Control Methods and Apparatuses and Display Devices". Both of the above-referenced applications are incorporated in the application by reference herein in their entirety. --.

Signed and Sealed this
Twenty-ninth Day of August, 2023

Katherine Kelly Vidal
*Director of the United States Patent and Trademark Office*